(12) United States Patent
Kozek et al.

(10) Patent No.: US 7,548,516 B2
(45) Date of Patent: Jun. 16, 2009

(54) METHOD AND COMMUNICATION ARRANGEMENT FOR TESTING SUBSCRIBER LINES

(75) Inventors: Werner Kozek, Vienna (AT); Bert Schüszler, Vienna (AT)

(73) Assignee: Nokia Siemens Networks GmbH & Co. KG, Munich (DE)

(*) Notice: Subject to any disclaimer, the term of this patent is extended or adjusted under 35 U.S.C. 154(b) by 580 days.

(21) Appl. No.: 10/571,960

(22) PCT Filed: Jul. 30, 2004

(86) PCT No.: PCT/EP2004/051672

§ 371 (c)(1),
(2), (4) Date: Mar. 14, 2006

(87) PCT Pub. No.: WO2005/027413

PCT Pub. Date: Mar. 24, 2005

(65) Prior Publication Data

US 2008/0253296 A1  Oct. 16, 2008

(51) Int. Cl.
*H04L 12/26* (2006.01)
(52) U.S. Cl. .................. 370/249; 370/241; 379/1.01
(58) Field of Classification Search ......... 370/241–253; 379/1.01, 2, 104; 375/221–225, 216, 220
See application file for complete search history.

(56) References Cited

U.S. PATENT DOCUMENTS

| | | | | |
|---|---|---|---|---|
| 4,989,202 | A * | 1/1991 | Soto et al. | 370/244 |
| 6,266,348 | B1 * | 7/2001 | Gross et al. | 370/493 |
| 6,895,081 | B1 * | 5/2005 | Schmidt et al. | 379/1.01 |
| 2002/0172329 | A1 | 11/2002 | Rashid-Farrokhi et al. | |
| 2006/0251221 | A1 * | 11/2006 | Rosenberg | 379/22.01 |

FOREIGN PATENT DOCUMENTS

| | | |
|---|---|---|
| DE | 196 50 974 A1 | 6/1998 |
| DE | 101 54 937 C1 | 11/2002 |
| WO | WO 02/13405 A2 | 2/2002 |

\* cited by examiner

*Primary Examiner*—Phuc H Tran
(74) *Attorney, Agent, or Firm*—K&L Gates

(57) ABSTRACT

To test at least one subscriber line that can be connected to a line unit, at least one test signal is emitted along the subscriber line, when the latter is not actively connected, and at least one resultant first echo signal is received, recorded and stored. In the short-circuited or open condition of the subscriber line, the test signal or signals is/are emitted via said line and at least one resultant second echo signal is stored. If an error occurs, the test signal or signals is/are emitted along the subscriber line and at least one resultant error echo signal is recorded, said error echo signal being compared with the first and/or second echo signal or signals. The advantage of the invention is that the location of an interruption in the subscriber line can be determined locally without the use of complex measuring devices.

20 Claims, 1 Drawing Sheet

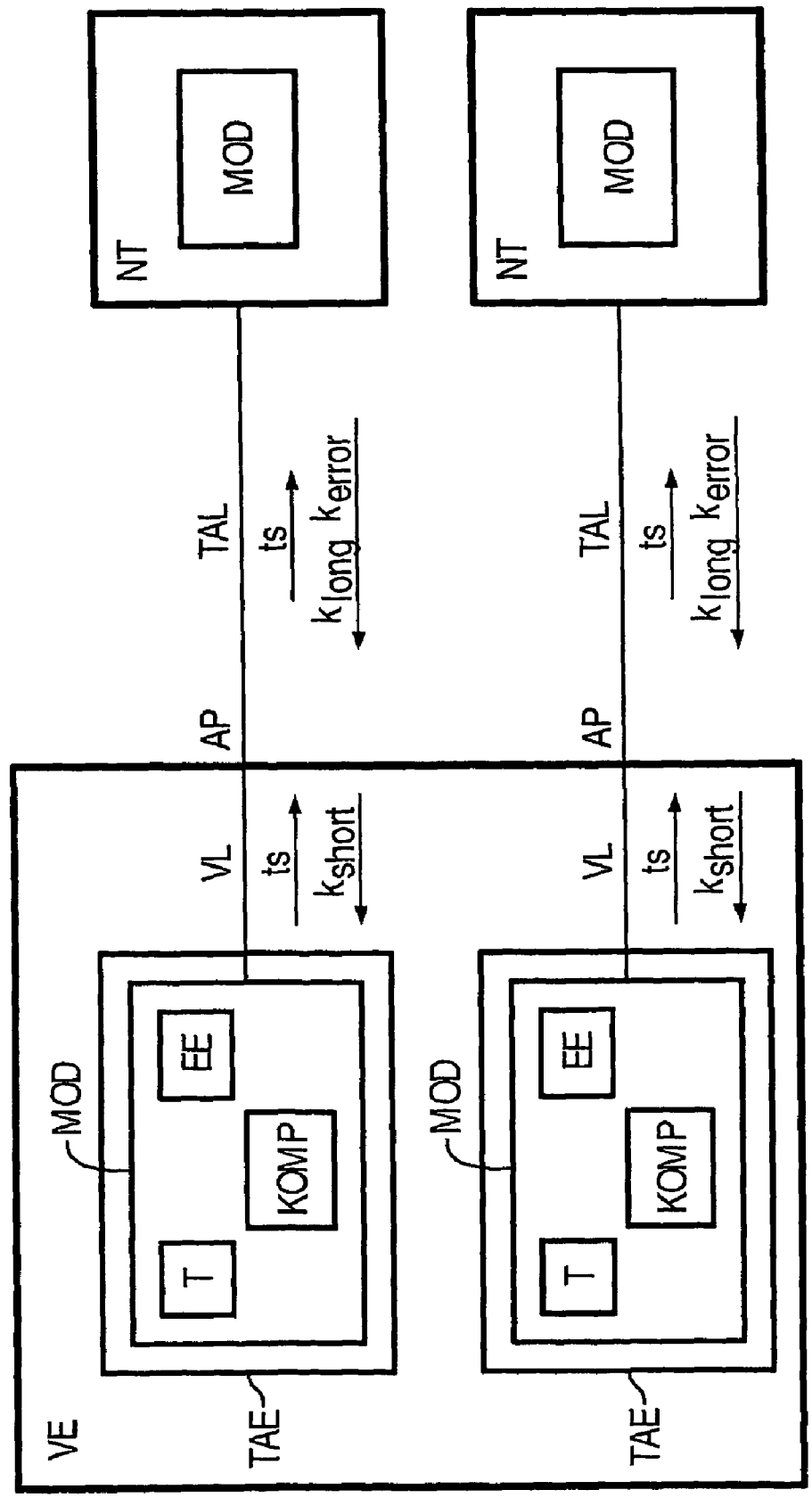

METHOD AND COMMUNICATION ARRANGEMENT FOR TESTING SUBSCRIBER LINES

CROSS REFERENCE TO RELATED APPLICATIONS

This application is the U.S. National Stage of International Application No. PCT/EP2004/051672, filed Jul. 30, 2004 and claims the benefit thereof. The International Application claims the benefits of German application No. 10342557.8 DE filed Sep. 15, 2003, both of the applications are incorporated by reference herein in their entirety.

FIELD OF INVENTION

The present invention relates to a method and communication arrangement for testing subscriber lines.

BACKGROUND OF THE INVENTION

In current communication networks, the subscribers or, more precisely, communication terminals assigned to said subscribers—such as, for example network termination equipment (NT: Network Termination)—are connected to central switching facilities or digital multiplexer devices (DSLAM: Digital Subscriber Line Access Multiplexer) via subscriber lines. The communication terminals on the subscriber side or the switching facilities are connected to the respective subscriber line—which can be embodied, for example, as a two-wire or four-wire line—are connected in each case via a subscriber line unit or via a modem arranged in the subscriber line unit, whereby a plurality of subscriber lines can be connected to one subscriber line unit.

Data communication between the modems via the subscriber line can take place, for example, using an xDSL transmission method. With transmission methods of this kind, one or more parameters characterizing the respective subscriber line (such as, for example, line length, terminating impedance, position of bridged taps) are determined by the modem on the switching center side as part of a prequalification process before the start of the actual data transmission and before a subscriber-side modem is connected (single-ended operation). In this way information relating to the maximum attainable data rate can be made available in advance in each case to the subscriber to be connected or the future user. In addition to the prequalification process, further methods for single-ended and double-ended testing of subscriber lines are known. Thus, for example, an ADSL prequalification method with echo canceller optimization to maximum selectivity is described in DE 10154937.

SUMMARY OF INVENTION

Although methods of this kind are also suitable in principle for diagnosing interruptions on the exchange (central office) side, said methods require either specific measuring equipment associated with economic investment or a reprogramming of the modem on the switching center side.

An object of the invention is to provide a method for testing subscriber lines, in particular for diagnosing interruptions on the exchange side, in which the use of cost-intensive measuring equipment can be dispensed with. The object is achieved based on a method and a communication arrangement according to the independent claims.

In the method according to the invention for testing at least one subscriber line that can be connected to a subscriber line unit, at least one test signal is generated and transmitted in the direction of the subscriber line. The essential aspect of the method according to the invention is that in the event of a subscriber line not being actively connected the at least one test signal is transmitted by the subscriber line unit in the direction of the at least one subscriber line and at least one first echo signal resulting therefrom is received, recorded and stored. In the event of at least one subscriber line connected in the short-circuited or open-circuit condition to the subscriber line unit, the at least one test signal is transmitted by the subscriber line unit via the at least one subscriber line and at least one second echo signal resulting therefrom is received, recorded and stored. If a malfunction occurs, the at least one test signal is transmitted by the subscriber line unit in the direction of the at least one subscriber line and at least one error echo signal resulting therefrom is received and recorded. The at least one recorded error echo signal is compared with the at least one first and/or second stored echo signal.

The essential advantage of the method according to the invention is that at least one interruption of the subscriber line on the exchange side or switching center side can be clearly detected by comparison of the recorded error echo signal with the first and/or second stored echo signal, without the use of measuring equipment representing a substantial financial investment. Furthermore, with the aid of the method according to the invention the most serious xDSL malfunctions can be quickly and easily detected and appropriate measures taken.

According to an advantageous embodiment of the inventive method, the test signals are transmitted as part of a training phase. By means of this advantageous embodiment the method according to the invention is simplified further, since already existing or, as the case may be, standardized test signals (which are transmitted, for example, as part of the prequalification process) can be used. Test signals of this kind transmitted as part of a training phase are described for example in the publications ITU-T G.994. 1 Handshake procedures for digital subscriber line (DSL) transceivers ITU-T G.992.3 Asymmetric digital subscriber line (ADSL) transceivers—2.

The at least one test signal (ts) is advantageously generated by a modem assigned to the respective subscriber line unit. With commercially available modems, in order to perform the method according to the invention use can be made of the training or prequalification techniques already implemented in circuitry in chips, as a result of which the method can be implemented with minimal technical overhead and therefore with a small economic investment.

Further advantageous embodiments of the method according to the invention as well as a communication arrangement for testing subscriber lines can be derived from the dependent claims.

BRIEF DESCRIPTION OF THE DRAWING

The method according to the invention is explained in more detail below with reference to a block diagram.

DETAILED DESCRIPTION OF INVENTION

The block diagram shows a central switching equipment VE having a plurality of subscriber line units TAE which is arranged, for example, in the subscriber local loop area of a communication network (also referred to as access network).

The central switching equipment VE is embodied, for example, for switching broadband data streams—e.g. video data streams). A plurality of subscribers—not shown—are connected to the switching equipment VE in each case via a network termination unit NT (Network Termination) and a subscriber line TAL to a subscriber line unit TAE. The subscriber line TAL is connected to the subscriber line unit TAE via an access point AP, which is also referred to in switching equipment contexts as a main distribution frame MDF. The access point AP is frequently connected to the subscriber line unit TAE via a trunk line VL disposed in the switching equipment VE.

Arranged in the subscriber line unit TAE and in the network termination unit NT in each case is a modem MOD which in the present exemplary embodiment are configured in accordance with an xDSL transmission method such as, for example, ADSL.

During the operation of the communication arrangement shown in the block diagram the situation occurs from time to time whereby the subscriber line TAL is interrupted on the exchange (central office) side, which is to say at the switching equipment VE end or at some other point on the subscriber line TAL in the direction of the subscriber. The method according to the invention offers a way of determining the location of the interruption on the subscriber line more precisely.

In order to implement the method according to the invention, the modem MOD arranged in the switching equipment VE has test means T for generating and transmitting test signals and acquisition means EE for receiving and recording echo signals resulting, i.e. reflected, from the transmitted test signal, as well as comparison means KOMP for comparing the recorded echo signals. It should be noted that the method according to the invention can also be performed by the modem MOD arranged in the network termination equipment NT on the subscriber side.

The implementation of the method according to the invention is explained in more detail below.

In the course of a modem self-test during the initial installation of the subscriber line unit TAE—also referred to as a line card—, in other words prior to connection of a subscriber or, as the case may be, a network termination equipment NT or by internal short-circuiting of the analog interface on the subscriber line unit TAE (equivalent to a subscriber line TAL that is not actively connected), a first test signal is generated by the test means T and transmitted in the direction of the subscriber line TAL, i.e. in the direction of the access point AP or MDF. The first echo signal reflected at, for example, the MDF is received by the acquisition means EE, recorded and retained or stored as an echo characteristic vector $k_{short}$ of the "short" subscriber line. In this case the echo characteristic vector k does not represent a linearly transformed echo pulse response; rather, the echo characteristic vector k represents a two-dimensional vector, consisting of total power of the received echo signal, and also group delay of the received echo signal.

The acquisition means EE are embodied in such a way that the aforesaid characteristic quantities or parameters are recorded in vectorized form and stored for comparison purposes.

On completion of the commissioning of the xDSL connection via the subscriber line TAL, following voluntary or possibly forced (on the exchange side) disconnection of the subscriber, a test signal ts is once again generated by the test means T and transmitted via the at least one subscriber line TAL in the direction of the subscriber. The echo signal reflected by the subscriber line TAL is recorded and stored in the manner described as an echo characteristic vector $k_{long}$ of the "long" subscriber line.

If an error occurs, the test signal is once again generated by the test means T and transmitted in the direction of the subscriber line TAL. The echo characteristic vector recorded and stored by the acquisition means EE in this process, in this case referred to as an error echo characteristic vector $k_{error}$, is subsequently compared with at least one of the stored echo characteristic vectors $k_{short}$, $k_{long}$ of the "short" and "long" subscriber line. Depending on the agreement of the error echo characteristic vector $k_{error}$ with the echo characteristic vector $k_{long}$ of the long line or, as the case may be, $k_{short}$ of the short line, a conclusion can be drawn as to whether the subscriber line TAL is interrupted on the switching equipment VE or exchange (central office) side—for example, in the vicinity of the MDF—or whether there is an interruption at some other location such as, for example, on the subscriber side.

The comparison of the recorded and stored echo characteristic vectors $k_{long}$, $k_{error}$, $k_{short}$ can advantageously be conducted according to the following rule $$\|k_{long} - k_{error}\| < \|k_{short} - k_{error}\|$$

where the norm of the vector k is defined according to $$\|k\| = \sqrt{\sum_n |k(n)|^2}.$$

The above cited comparison rule yields binary information which allows deductions to be made about the location of the line interruption.

As explained in the introduction, the subscriber line can comprise several wire pairs. With an HDSL transmission method, the information is transmitted for example via a subscriber line comprising 2 wire pairs. In this case the method according to the invention is performed separately for each wire pair of the subscriber line.

The invention claimed is:

1. A method for testing a subscriber line in a communication network, comprising:
   while the subscriber line is not actively connected to a subscriber line unit:
   transmitting a first test signal by the subscriber line unit in the direction of the subscriber line,
   receiving a first echo signal as a result of the transmission of the first test signal, and
   storing the first echo signal;
   while the subscriber line is connected to the subscriber line unit:
   transmitting a second test signal by the subscriber line unit,
   receiving a second echo signal as a result of the transmission of the second test signal, and
   storing the second echo signal; and
   if a malfunction occurs:
   transmitting a third test signal by the subscriber line unit,
   receiving an error echo signal as a result of the transmission of the third test signal, and
   storing the error echo signal,
   wherein the error echo signal is compared with the first or stored second echo signal.

2. The method according to claim 1, wherein the subscriber line is connected to the subscriber line unit in a short-circuited or an open circuit condition.

3. The method according to claim 1, wherein error echo signal is compared with the first and second echo signal.

4. The method according to claim 1, wherein the test signals are transmitted as part of a training phase.

5. The method according to claim 1, wherein the echo signals are stored as two dimensional echo vectors having a total power of the echo and a group delay of an echo.

6. The method according to claim 5, wherein the stored signals are compared with each other.

7. The method according to claim 6, wherein the modem is embodied according to an xDSL transmission method.

8. The method according to claim 1, wherein the test signals are generated by a modem assigned to the respective subscriber line unit.

9. The method according to claim 1, wherein if the subscriber line includes a plurality of wire pairs, and the method is performed per wire pair.

10. A communication arrangement for testing a subscriber line in a communication network, comprising:
   while the subscriber line is not actively connected to a subscriber line unit:
      a first test signal is transmitted in the direction of the subscriber line, and
      a first echo signal as a result of the transmission of the first test signal is received and stored;
   while the subscriber line is connected to a subscriber line unit:
      a second test signal is transmitted via the subscriber line, and
      a second echo signal as a result of the transmission of the second test signal is received and stored;
   if a malfunction occurs:
      a third test signal is transmitted in the direction of the subscriber line,
      an error echo signal as a result of the transmission of the third test signal is received and stored; and
   an acquisition unit that receives and stores echo signals; and
   a comparator that compares the error echo signal with the first or second stored echo signal.

11. The communication arrangement according to claim 10, wherein the subscriber line is connected to the subscriber line unit in a short-circuited or an open circuit condition.

12. The communication arrangement according to claim 10, wherein error echo signal is compared with the first and second echo signal.

13. The communication arrangement according to claim 12, wherein the error echo signal that is compared is the stored error echo signal.

14. The communication arrangement according to claim 10, wherein the error echo signal that is compared is the stored error echo signal.

15. The communication arrangement according to claim 10, wherein the echo signals are stored and compared as two-dimensional echo vectors comprising a total power of an echo and a group delay of the echo.

16. The communication arrangement according to claim 10, wherein the generator/transmitter and the acquisition unit are arranged in a modem assigned to the subscriber line unit.

17. The communication arrangement according to claim 10, wherein the subscriber line unit is arranged in a switching equipment or a digital multiplexer device.

18. The communication arrangement according to claim 10, wherein the subscriber line is operatively connected to the subscriber line unit via an access point assigned to the switching equipment, the access point operatively connected to the subscriber line unit via a trunk line.

19. The communication arrangement according to claim 10, wherein the subscriber line comprises a plurality of wire pairs, wherein the test signals are transmitted in the direction of each wire pair, for each wire pair:
   the echo results are stored,
   the error echo result is compared with the first and/or second stored echo signal.

20. The communication arrangement according to claim 19, wherein the error echo result is the stored error echo result.

* * * * *